United States Patent
Bastide et al.

(10) Patent No.: US 10,127,211 B2
(45) Date of Patent: *Nov. 13, 2018

(54) OVERLAY OF INPUT CONTROL TO IDENTIFY AND RESTRAIN DRAFT CONTENT FROM STREAMING

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/716,875

(22) Filed: May 20, 2015

(65) Prior Publication Data

US 2016/0344825 A1 Nov. 24, 2016

(51) Int. Cl.
*G06F 17/24* (2006.01)
*H04L 12/26* (2006.01)
*H04L 29/08* (2006.01)
*H04L 29/06* (2006.01)

(52) U.S. Cl.
CPC .......... *G06F 17/24* (2013.01); *G06F 17/243* (2013.01); *H04L 43/10* (2013.01); *H04L 63/102* (2013.01); *H04L 67/22* (2013.01)

(58) Field of Classification Search
CPC ........ H04L 43/10; H04L 64/102; H04L 67/22
See application file for complete search history.

(56) References Cited

U.S. PATENT DOCUMENTS

| 7,533,351 | B2 | 5/2009 | Bellwood et al. |
| 7,568,152 | B1 | 7/2009 | Wason |
| 8,521,821 | B2 * | 8/2013 | van der Horst ..... H04L 63/0428 345/629 |
| 8,549,643 | B1 * | 10/2013 | Shou ..................... G06F 21/556 455/410 |
| 8,707,437 | B1 * | 4/2014 | Ming-Chang ......... G06F 21/554 726/22 |

(Continued)

OTHER PUBLICATIONS

Jang et al.; "Gyrus: A Framework for User-Intent Monitoring of Text-Based Networked Applications", Proceedings of The 21 Annual Network and Distributed System Security (NDSS) Symposium, Feb. 23-26, 2014, pp. 1-16.*

(Continued)

*Primary Examiner* — Kamal B Divecha
*Assistant Examiner* — Eui H Kim
(74) *Attorney, Agent, or Firm* — North Shore Patents, P.C.; Michele Liu Baillie

(57) ABSTRACT

A system determines whether to restrain collection of data entered into an input control by generating an overlay input field for capturing data entered by a user in response to determining that the collection of data is to be restrained. The data may be edited by the user, via the overlay input field, prior to the user submitting the data to the input control. The system submits the data captured in the overlay input field to the input control. The editing performed by the user within the overlay input field restrains collection of data by input controls that auto stream data as the data is entered into the input control.

9 Claims, 4 Drawing Sheets

(56) References Cited

U.S. PATENT DOCUMENTS

| | | | |
|---|---|---|---|
| 8,935,300 B1 | 1/2015 | Maeng | |
| 9,531,655 B1* | 12/2016 | Buchheit | H04L 51/12 |
| 9,826,018 B1* | 11/2017 | Walfish | H04L 67/02 |
| 9,832,227 B2* | 11/2017 | Bhargava | H04L 63/02 |
| 2003/0038754 A1 | 2/2003 | Goldstein et al. | |
| 2004/0128552 A1* | 7/2004 | Toomey | G06F 21/57 |
| | | | 726/22 |
| 2008/0235578 A1 | 9/2008 | Heed et al. | |
| 2009/0241196 A1* | 9/2009 | Troyansky | G06F 21/552 |
| | | | 726/25 |
| 2009/0254994 A1* | 10/2009 | Waterson | G06F 21/83 |
| | | | 726/26 |
| 2010/0079508 A1 | 4/2010 | Hodge et al. | |
| 2010/0180297 A1 | 7/2010 | Levine et al. | |
| 2011/0167494 A1* | 7/2011 | Bowen | G06F 21/566 |
| | | | 726/24 |
| 2011/0209196 A1* | 8/2011 | Kennedy | G06F 21/55 |
| | | | 726/1 |
| 2011/0258529 A1* | 10/2011 | Doig | G06Q 30/02 |
| | | | 715/234 |
| 2012/0014673 A1 | 1/2012 | O'Dwyer | |
| 2012/0206472 A1 | 8/2012 | Kandekar et al. | |
| 2013/0019155 A1 | 1/2013 | Wolfston et al. | |
| 2013/0298071 A1 | 11/2013 | Wine | |
| 2013/0340089 A1* | 12/2013 | Steinberg | H04L 63/10 |
| | | | 726/27 |
| 2014/0157205 A1 | 6/2014 | Baird | |
| 2014/0344288 A1 | 11/2014 | Evans et al. | |
| 2014/0380228 A1 | 12/2014 | Shu | |
| 2015/0347747 A1* | 12/2015 | Yancey | G06F 21/62 |
| | | | 726/28 |

OTHER PUBLICATIONS

Van Wijk, G. Gybels; "Framework for Real-Time Text over IP using the Session Initiaiton Protocol (SIP)", Jun. 2008, Network Working Group. (Year: 2008) (Year: 2008).*

Anonymous, "Motions and Gestures Settings", Sprint Samsung Galaxy S 5 User Guide, Downloaded May 14, 2015.

Golbeck, "On Second Thought . . . ", Slate.com, http://www.slate.com/articles/technology/future_tense/2013/12/facebook_self_censorship_what_happens_to_the_posts_you_don_t_publish.html, downloaded May 14,2015.

Hong et al.; "Smart Compositing: A Real-Time Content-Adaptive Blending Method for Remote Visual Collaboration", Acoustics, Speech and Signal Processing (ICASSP), 2012 IEEE International Conference on, Mar. 25-30, 2012, pp. 2317-2320.

List of IBM Patents or Patent Applications Treated as Related dated Jul. 28, 2016 (2 pages).

A. Van Wiljk, G. Bybels; "Framework for REal-Time Text over IP using the session Initiation Protocol (SIP)", Jun. 2008, Network Working Group.

* cited by examiner

OVERLAY OF INPUT CONTROL TO IDENTIFY AND RESTRAIN DRAFT CONTENT FROM STREAMING

BACKGROUND

Many applications, particularly those related to social media, have the ability to capture input as a user enters it, even if the user deletes the input without submitting. The user may self-censor the input for a variety of reasons, but applications that auto stream data negate the user's efforts. The data collected by applications that auto stream may be stored and viewed by others based on the policies, privacy agreements, etc., associated with those applications. The user may not be aware when applications auto stream inputted data. Thus, it would be helpful if the user were able to identify when an application auto streams data. It would also be helpful if the user were able to restrain the inputted content from auto streaming.

SUMMARY

According to one embodiment of the present invention, in a method for determining whether to restrain collection of data entered into an input control, the method generates an overlay input field for capturing data entered by a user in response to determining that the collection of data is to be restrained. The data may be edited by the user, via the overlay input field, prior to the user submitting the data to the input control. The method receives notification from the user that the editing is complete, and submits the data captured in the overlay input field to the input control. The editing performed by the user within the overlay input field restrains collection of data by input controls that auto stream data as the data is entered into the input control.

In one aspect of embodiments disclosed herein, when the method generates the overlay input field for capturing the data entered by the user, the method determines, by monitoring network communications, whether the input control auto streams data as the data is entered into the input control.

In one aspect of embodiments disclosed herein, when the method generates the overlay input field for capturing the data entered by the user, the method creates a network policy, associated with a network, that is applied when the data is entered into the input control. The network policy specifies whether the overlay input field is required when communicating with the network.

In one aspect of embodiments disclosed herein, when the method creates the network policy, the method determines whether the network is a trusted network.

In one aspect of embodiments disclosed herein, when the method generates the overlay input field for capturing the data entered by the user, the method detects that the user has accessed the input control. The method then applies a content policy to inputted content to determine whether to restrain collection of data.

In one aspect of embodiments disclosed herein, when the method applies the content policy to the inputted content to determine whether to restrain collection of data, the method detects whether at least one of the inputted content and a recipient of the inputted content is trusted. If it is trusted, the method determines that restraining the collection of data is not required.

In one aspect of embodiments disclosed herein, when the method detects whether at least one of the inputted content and the recipient of the inputted content is trusted, the method transmits a portion of the content to determine whether the inputted content and/or the recipient of the inputted content is trusted.

In one aspect of embodiments disclosed herein, when the method generates the overlay input field for capturing the data entered by the user, the method renders a notification indicating that the overlay input field has been generated. The notification comprises at least one of a visual notification and an audio notification.

In one aspect of embodiments disclosed herein, when the method submits the data captured in the overlay input field to the input control, the method creates a buffer in which to capture inputted content. The method then applies a buffer policy to the inputted content to optimize performance of system.

System and computer program products corresponding to the above-summarized methods are also described and claimed herein.

DETAILED DESCRIPTION

Figure 1:
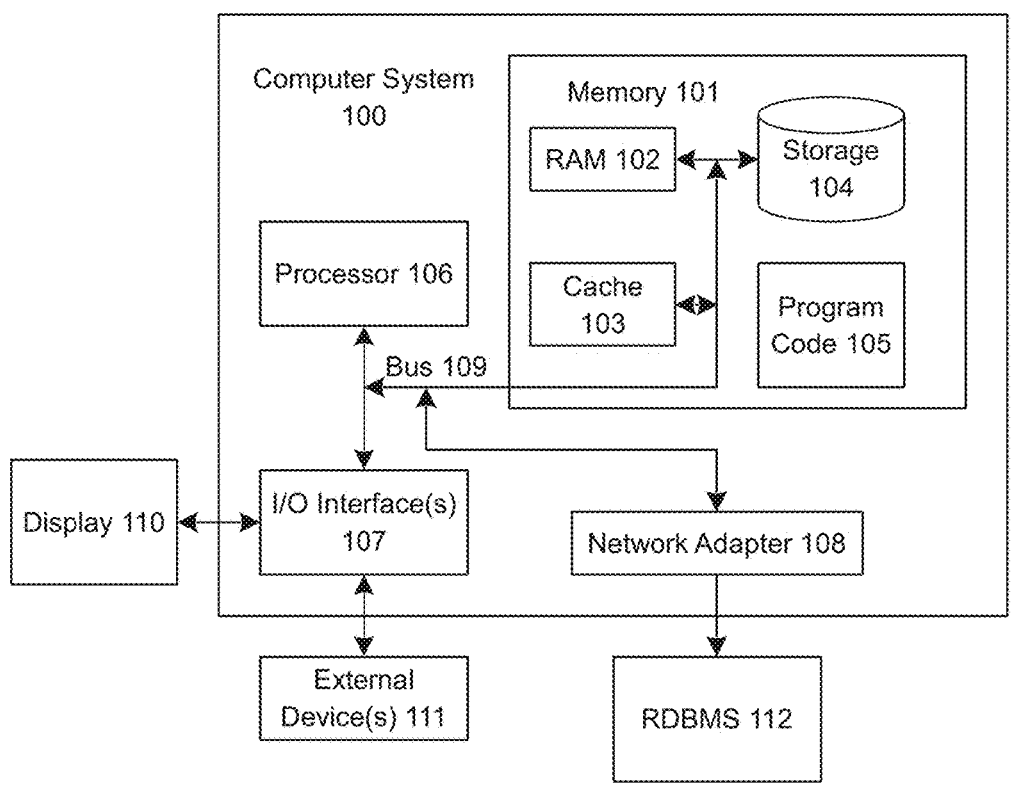
FIG. 1 illustrates an embodiment of a system for determining whether to restrain collection of data entered into an input control, according to embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for determining whether to restrain collection of data entered into an input control, according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
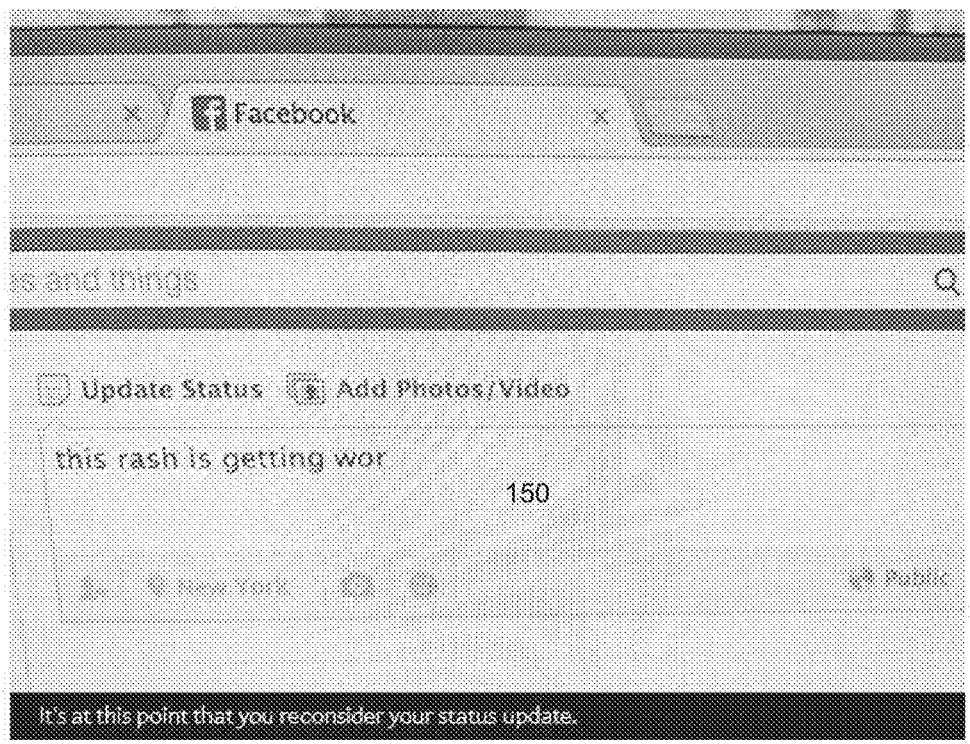
FIG. 2 illustrates an example input control, according to embodiments disclosed herein.

FIG. 2 illustrates an example input control 150, according to embodiments disclosed herein. The input control 150 resides, for example, within a social media application. In this example embodiment, the user begins to enter an update into the input control 150.

Figure 3:
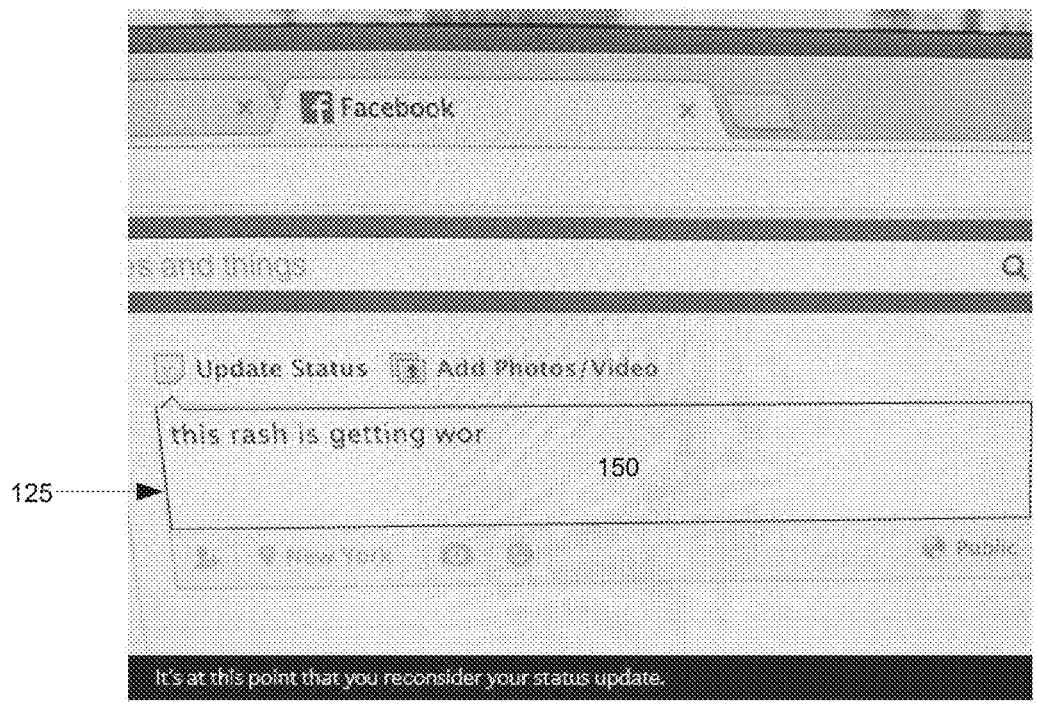
FIG. 3 illustrates an example input control with an overlay input field, according to embodiments disclosed herein.

FIG. 3 illustrates an example input control 150 with an overlay input field 125, according to embodiments disclosed herein. The method determines whether to restrain collection of data entered into the input control 150. In this example embodiment, the method restrains the collection of data by providing an overlay input field 125 to capture input entered by the user into the input control 150. In this example embodiment, the overlay input field 125 is a visual notification that outlines (i.e., wraps a border around) the perimeter of the input control 150. The visual notification may be in any color and/or in any format.

Figure 4:
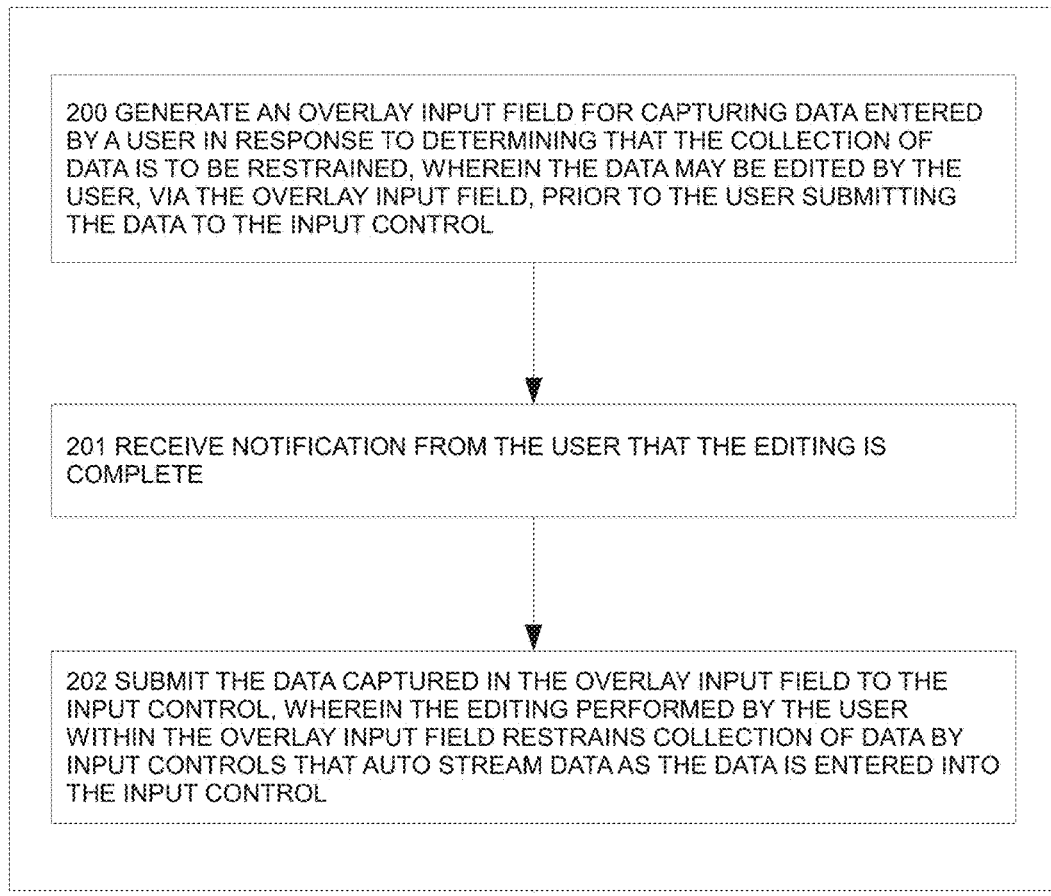
FIG. 4 is a flowchart illustrating an embodiment of a method for determining whether to restrain collection of data entered into an input control, according to embodiments disclosed herein.

FIG. 4 illustrates an embodiment of a method for determining whether to restrain collection of data entered into an input control 150, according to embodiments disclosed herein. At 200, the method, via the computing processor 106, generates an overlay input field 125 for capturing data entered by a user in response to the method determining that the collection of data is to be restrained. The method determines when the overlay field is needed, and, in response, provides the overlay field. The data may be edited by the user, via the overlay input field 125, prior to the user submitting the data to the input control 150. The collection of data to be restrained refers to the collecting of data that would otherwise be auto streamed if the overlay field were not present. The input control 150 may pass data to any type of application and/or network. The method notifies the user when the overlay input field 125 is being used, and the overlay input field 125 prevents the data entered into the input control 150 from being auto streamed until the user is ready to submit the data. The action of auto streaming collects data as the user is entering it into the input field, even if the user edits the data prior to submitting the data to the input field. The purpose of the overlay field is to restrain the auto streaming to allow the user to finalize and/or edit their thoughts before submitting the data to the input field. Restraining indicates the auto streaming is prevented until the user submits the data to the input field. Thus, privacy is maintained where it may not otherwise exist.

At 201, the method receives notification from the user that the editing is complete. The user may provide this notification in a variety of ways, for example, such as selecting a key that submits the data entered in the input control 150 to the application and/or the network.

At 202, the method submits the data captured in the overlay input field 125 to the input control 150. The editing performed by the user within the overlay input field 125 restrains collection of data by input controls that auto stream data as the data is entered into the input control 150. In an example embodiment, when the method generates the overlay input field 125, the method creates a buffer in which to collect data entered by the user. The data may be edited by the user, via the overlay input field 125, prior to the user submitting the data to the input control 150. The purpose of the overlay field is to prevent auto streaming (when auto streaming occurs) prior to the user submitting the data to the input field. To the user, it appears that the user is entering data into the input control 150 itself. The data entered into the overlay input field 125 remains in the buffer until the user submits the data to the input control 150. Then, the data is transferred from the buffer to the input control 150. In other words, when the method receives notification from the user that the editing is complete, the method submits the data captured in the overlay input field 125 to the input control 150 of the application. The overlay input field 125 prevents the inputted data from being auto streamed until the method submits the data captured in the overlay input field 125.

In an example embodiment when the method generates the overlay input field 125 for capturing the data entered by the user, the method determines, by monitoring network communications, whether the input control 150 auto streams data as the data is entered into the input control 150. The method identifies whether the input control 150 auto streams data as that data is entered (into the input control 150) in a variety of ways. In one example embodiment, the method monitors network communications to determine if the input control 150 auto streams data. The method may push test data through the input control 150, and check if that test data is passed on to the network. If the test data is passed on to the network, the method determines that the input control 150 auto streams data, and a overlay input field 125 is required whenever a user accesses that input control 150. The method may monitor network connections by using active monitoring, as described above (i.e., injecting test data into the network, and monitoring that data), or passive monitoring, where the method observes the traffic that currently exists on the network.

In an example embodiment, when the method generates the overlay input field 125 for capturing the data entered by the user, the method creates a network policy that is applied when the data is entered into the input control 150. The network policy is associated with the network. The network policy specifies whether the overlay input field 125 is required when communicating with the network. As noted above, the method may monitor network connections to determine if the input control 150 auto streams data. Based on that determination, the method creates a network policy that is applied when a user interacts with that network. For example, a user may access a search engine to begin a search. If the method has previously identified the search engine as auto streaming data, the method applies the overlay input field 125 to an input control 150 contained within the search engine web page when the user accesses that search engine. If the method has previously determined that an application does not auto stream data, then when the method applies the network policy, the method determines that the overlay input field 125 is not required. In another example embodiment, the method may create a network policy when an application requests that a user grant permission for access while using an application, for example, a smart phone application.

In an example embodiment, when the method creates the network policy, the method determines whether the network is a trusted network. If the method determines that the network is a trusted network, the method may determine the overlay input field 125 is not required. Likewise, if the method determines that the network is not a trusted network, the method may use a variety of methods to determine whether the overlay input field 125 is required.

In an example embodiment, when the method generates the overlay input field 125 for capturing the data entered by the user, the method detects that the user has accessed the input control 150, and applies a content policy to the inputted content to determine whether to restrain collection of data. When a user loads an application or initiates a session, the method identifies the input controls that are available. The input control 150 may be any type of input control 150 (i.e., input field, checkbox, radio button, etc.) that accepts any type of input. The application may be any type of online form, collaborative editing session, etc. When the method detects that the user has accessed an input control 150, the method applies a content policy to the content entered by the user to determine whether to restrain the collection of data. In an example embodiment, a user may enter confidential company information into a search engine to determine, for example, if competitors are working on similar projects. The method applies a content policy to the information entered by the user, and determines whether that data should be restrained. The content policy may leverage semantic analysis. If the method determines that the data should be restrained, the method generates an overlay input field 125 for that input control 150. The method may also alert the user that the information the user has entered may be confidential, and the user may not want to enter that data into the search engine. The method may also apply a content policy to determine if the content entered by the user is a draft or submission (for example, as in the case of document editing applications). The method may also apply different policies if the content comprises text versus if the content comprises images.

In an example embodiment, when the method applies the content policy to the inputted content to determine whether to restrain collection of data, the method detects whether at least one of the inputted content and a recipient of the inputted content is trusted. If the inputted content and/or the recipient are trusted, then the method determines that restraining the collection of data is not required. For example, the method may apply a content policy to the contents of a chat session with a trusted recipient, or to an email sent to a trusted recipient. When the method determines that at least one of the inputted content or the recipient are trusted, the method determines that restraining the collection of data is not required. In another example embodiment, the method may determine that an application and/or network are trusted, or that application an/or network trusts the user (and therefore, the application and/or network is trusted). The user may also specify that a particular application and/or network are trusted.

In an example embodiment, when the method is detecting whether at least one of the inputted content and the recipient of the inputted content are trusted, the method transmits a portion of the content to determine whether the inputted content and/or the recipient of the inputted content are trusted. For example, the method may transmit a portion of an email address of the recipient, or a hash tag to determine whether the inputted content and/or the recipient of the inputted content are trusted.

In an example embodiment, when the method generates the overlay input field 125 for capturing the data entered by the user, the method renders a notification indicating that the overlay input field 125 has been generated. The notification may be at least one of a visual notification and an audio notification. FIG. 3 illustrates an example embodiment of a visual notification for the overlay input field 125. The overlay input field 125 may be in any color or any format that alerts the user to the presence of the overlay input field 125.

In an example embodiment, when the method submits the data captured in the overlay input field 125 to the input control 150, the method creates a buffer in which to capture inputted content. The method then applies a buffer policy to the inputted content to optimize performance of system. The buffer policy, for example, may buffer the content and notify the user to submit the content if the content is too long to optimize the system performance. The buffer policy may also buffer multiple short content together to submit multiple content at once. The method may balance the size of the inputted content (i.e., too long or too short) to optimize performance of the system. For example, in situations with multiple round trips of edited content, the buffer policy may reduce the number of round trips, again, to optimize the performance of the system.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory computer program product for determining whether to restrain collection of data entered into an input control of an application, which auto streams data as it is entered by a user to a network, the computer program product comprising:
    a computer readable storage medium having computer readable program code embodied therewith, the program code executable by a computing processor configured to:
        determine that the input control of the application auto streams data, where data would be streamed to a network as the data is entered into the input control by a user prior to the user submitting the data to the input control, comprising:
        push test data through the input control,
        determine whether the test data is streamed to the network, and
        upon determining that the test data is streamed to the network, determine that the input control auto streams data;
        in response to determining that the input control auto streams data and based on a created network policy, determine that an overlay input field is required to prevent the auto stream of the data entered by the user to the network until the user submits the data to the input control,
            wherein the created network policy is based on the determination that the input control has been determined to auto stream data associated with the network, that is applied when data is entered into the input control for the network, the network policy specifying whether the overlay input field is required when communicating with the network;
        generate the overlay input field for capturing the data entered by the user in response to determining that the auto stream of the data is to be prevented until the user submits the data to the input control, wherein the data is edited by the user, via the overlay input field, prior to the user submitting the data to the input control, wherein the data entered into the overlay input field is stored in a buffer until the user submits the data to the input control, wherein the buffer is created when the overlay input field is generated;
        receive a notification from the user that the editing of the data is complete; and
        in response to the notification, submit the data captured in the overlay input field to the input control by transferring the data from the buffer to the input control.

2. The computer program product of claim 1 wherein the computer readable program code configured to generate the overlay input field for capturing the data entered by the user is further configured to:
    detect that the user has accessed the input control; and
    apply a content policy to inputted content to determine whether to restrain collection of data.

3. The computer program product of claim 2 wherein the computer readable program code configured to apply the content policy to the inputted content to determine whether to restrain collection of data is further configured to:
    detect whether at least one of the inputted content and a recipient of the inputted content is trusted; and if trusted, determine that restraining the collection of data is not required.

4. The computer program product of claim 1 wherein the computer readable program code configured to generate the overlay input field for capturing the data entered by the user is further configured to:
render a second notification indicating that the overlay input field has been generated, wherein the second notification comprises at least one of a visual notification and an audio notification.

5. The computer program product of claim 1, wherein the computer readable program code configured to determine that the input control auto streams data as data is entered into the input control is further configured to:
determine whether the input control has previously been determined to auto stream data; and
when the input control has previously been determined to auto stream data, determine that the overlay input field is required; and
when the input control has previously been determined to not auto stream data, determine that the overlay input field is not required.

6. A system comprising:
a computing processor; and
a non-transitory computer readable storage medium operationally coupled to the processor, the computer readable storage medium having computer readable program code embodied therewith for determining whether to restrain collection of data entered into an input control of an application, which auto streams data as it is entered by a user to a network, to be executed by the computing processor, the computer readable program code configured to:
determine that the input control of the application auto streams data, wherein data would be streamed to a network as the data is entered into the input control by a user prior to the user submitting the data to the input control, comprising:
push test data through the input control;
determine whether the test data is streamed to the network; and
upon determining that the test data is streamed to the network, determine that the input control auto streams data;
in response to determining that the input control auto streams data and based on a created network policy,
determine that an overlay input field is required to prevent the auto stream of the data entered by the user to the network until the user submits the data to the input control,
wherein the created network policy is based on the determination that the input control has been determined to auto stream data associated with the network, that is applied when data is entered into the input control for the network, the network policy specifying whether the overlay input field is required when communicating with the network;
generate the overlay input field for capturing the data entered by the user in response to determining that the auto stream of the data is to be prevented until the user submits the data to the input control, wherein the data is edited by the user, via the overlay input field, prior to the user submitting the data to an input control, wherein the data entered into the overlay input field is stored in a buffer until the user submits the data to the input control, wherein the buffer is created when the overlay input field is generated;
receive a notification from the user that the editing of the data is complete; and
in response to the notification, submit the data captured in the overlay input field to the input control by transferring the data from the buffer to the input control.

7. The system of claim 6 wherein the computer readable program code configured to generate the overlay input field for capturing the data entered by the user is further configured to:
detect that the user has accessed the input control; and
apply a content policy to inputted content to determine whether to restrain collection of data.

8. The system of claim 6 wherein the computer readable program code configured to generate the overlay input field for capturing the data entered by the user is further configured to:
render a second notification indicating that the overlay input field has been generated, wherein the second notification comprises at least one of a visual notification and an audio notification.

9. The system of claim 6, wherein the computer readable program code configured to determine that the input control auto streams data as data is entered into the input control is further configured to:
determine whether the input control has previously been determined to auto stream data; and
when the input control has previously been determined to auto stream data, determine that the overlay input field is required; and
when the input control has previously been determined to not auto stream data, determine that the overlay input field is not required.

* * * * *